United States Patent
Yang et al.

(10) Patent No.: US 10,939,427 B2
(45) Date of Patent: Mar. 2, 2021

(54) PDCCH MONITORING SPAN DETERMINATION

(71) Applicant: QUALCOMM Incorporated, San Diego, CA (US)

(72) Inventors: Wei Yang, San Diego, CA (US); Peter Gaal, San Diego, CA (US); Huilin Xu, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/803,700

(22) Filed: Feb. 27, 2020

(65) Prior Publication Data
US 2020/0329461 A1 Oct. 15, 2020

Related U.S. Application Data

(60) Provisional application No. 62/832,827, filed on Apr. 11, 2019.

(51) Int. Cl.
*H04W 4/00* (2018.01)
*H04W 72/04* (2009.01)

(52) U.S. Cl.
CPC ..... *H04W 72/042* (2013.01); *H04W 72/0446* (2013.01)

(58) Field of Classification Search
CPC ...... H04W 72/04; H04W 88/08; H04W 76/00
See application file for complete search history.

(56) References Cited

U.S. PATENT DOCUMENTS

| | | | |
|---|---|---|---|
| 2019/0021045 A1* | 1/2019 | Kim | H04W 72/042 |
| 2019/0150124 A1* | 5/2019 | Nogami | H04W 72/0446 370/330 |
| 2019/0166593 A1* | 5/2019 | Liao | H04L 5/0094 |

(Continued)

OTHER PUBLICATIONS

Huawei., "Summary of 7.2.6.1 PDCCH Enhancements", 3GPP Draft, 3GPP TSG RAN WG1 Meeting #96bis, R1-1905656, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019, Apr. 9, 2019 (Apr. 9, 2019), XP051707715, 55 pages, Retrieved from the Internet: URL: http://www.3gpp.org/ftp/tsg%5Fran/WG1%5FRL1/TSGR1%5F96b/Docs/R1%2D1905656%2Ezip. [retrieved on Apr. 9, 2019] p. 38-p. 55.

(Continued)

*Primary Examiner* — Siren Wei
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station, information identifying one or more control channel monitoring span capabilities. The UE may receive, from the base station, information identifying a plurality of control channel monitoring occasions. The UE may generate a bitmap based at least in part on the plurality of control channel monitoring occasions. The UE may determine, in accordance with the bitmap and based at least in part on the information identifying the one or more control channel monitoring span capabilities, a span pattern indicating one or more locations of one or more spans in a slot. Numerous other aspects are provided.

30 Claims, 5 Drawing Sheets

(56) References Cited

U.S. PATENT DOCUMENTS

| | | | |
|---|---|---|---|
| 2019/0208550 A1* | 7/2019 | Ko | H04W 72/0446 |
| 2019/0215098 A1* | 7/2019 | Tiirola | H04L 1/0038 |
| 2019/0306737 A1* | 10/2019 | Kwak | H04L 5/0053 |

OTHER PUBLICATIONS

Huawei., "Summary of 7.2.6.1 PDCCH Enhancements", 3GPP Draft, 3GPP TSG RAN WG1 Meeting #96bis, R1-1905740, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019, Apr. 15, 2019 (Apr. 15, 2019), XP051707797, 65 pages, Retrieved from the Internet: URL: http://www.3gpp.org/ftp/tsg%5Fran/WG1%5FRL1/TSGR1%5F96b/Docs/R1%2D1905740%2Ezip. [retrieved on Apr. 15, 2019] p. 38-p. 65.

Huawei, et al., "Clarifications on Rel-15 UE Features", 3GPP Draft, 3GPP TSG RAN WG1 Meeting #96bis, R1-1905518, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019, Apr. 8, 2019 (Apr. 8, 2019), XP051707582, 6 pages, Retrieved from the Internet: URL: http://www.3gpp.org/ftp/tsg%5Fran/WG1%5FRL1/TSGR1%5F96b/Docs/R1%2D1905518%2Ezip. [retrieved on Apr. 8, 2019] section 2.3.

Intel Corporation: "On PDCCH Enhancements for eURLLC", 3GPP Draft, 3GPP TSG RAN WG1 #96bis, R1-1904305 Intel—EURLLC PDCCH Enhancements Final, 3rd Generation Partnership Project (3GPP), Mobile Competence Centre, 650, Route Des Lucioles, F-06921 Sophia-Antipolis Cedex, France, vol. RAN WG1, No. Xi 'an, China, Apr. 8, 2019-Apr. 12, 2019, Apr. 3, 2019 (Apr. 3, 2019), XP051707181, 9 pages, Retrieved from the Internet: URL: http://www.3gpp.org/ftp/tsg%5Fran/WG1%5FRL1/TSGR1%5F96b/Docs/R1%2D1904305%2Ezip. [retrieved on Apr. 3, 2019] section 3.

Intel Corporation: "On PDCCH Enhancements for eURLLC", 3GPP Draft, 3GPP TSG RAN WG1 #97, R1-1906806, Intel—EURLLC PDCCH Enhancements Final, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728257, 11 pages, Retrieved from the Internet: URL: http://www.3gpp.org/ftp/Meetings%5F3GPP%5FSYNC/RAN1/Docs/R1%2D1906806%2Ezip. [retrieved on May 13, 2019] section 3.

International Search Report and Written Opinion—PCT/US2020/020465—ISA/EPO—dated Jun. 2, 2020.

ZTE., "On PDCCH Enhancements for URLLC", 3GPP Draft, 3GPP TSG RAN WG1 Meeting #95, R1-1812384, On PDCCH Enhancements for URLLC, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 3, 2018 (Nov. 3, 2018), XP051478586, 8 pages, Retrieved from the Internet: URL: http://www.3gpp.org/ftp/tsg%5Fran/WG1%5FRL1/TSGR1%5F95/Docs/R1%2D1812384%2Ezip. [retrieved on Nov. 3, 2018] section 2.3.

* cited by examiner

PDCCH MONITORING SPAN DETERMINATION

CROSS-REFERENCE TO RELATED APPLICATION

This patent application claims priority to U.S. Provisional Patent Application No. 62/832,827, filed on Apr. 11, 2019, entitled "PDCCH MONITORING SPAN DETERMINATION," and assigned to the assignee hereof. The disclosure of the prior Application is considered part of and is incorporated by reference in this Patent Application.

FIELD OF THE DISCLOSURE

Aspects of the present disclosure generally relate to wireless communication, and to techniques and apparatuses for physical downlink control channel (PDCCH) monitoring span determination.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting, to a base station, information identifying one or more control channel monitoring span capabilities; receiving, from the base station, information identifying a plurality of control channel monitoring occasions; generating a bitmap based at least in part on the plurality of control channel monitoring occasions; and determining, in accordance with the bitmap and based at least in part on the information identifying the one or more control channel monitoring span capabilities, a span pattern indicating one or more locations of one or more spans in a slot.

In some aspects, a UE for wireless communication may include memory and one or more processors operatively coupled to the memory. The memory and the one or more processors may be configured to transmit, to a base station, information identifying one or more control channel monitoring span capabilities; receive, from the base station, information identifying a plurality of control channel monitoring occasions; generate a bitmap based at least in part on the plurality of control channel monitoring occasions; and determine, in accordance with the bitmap and based at least in part on the information identifying the one or more control channel monitoring span capabilities, a span pattern indicating one or more locations of one or more spans in a slot.

In some aspects, a non-transitory computer-readable medium may store one or more instructions for wireless communication. The one or more instructions, when executed by one or more processors of a user equipment, may cause the one or more processors to: transmit, to a base station, information identifying one or more control channel monitoring span capabilities; receive, from the base station, information identifying a plurality of control channel monitoring occasions; generate a bitmap based at least in part on the plurality of control channel monitoring occasions; and determine, in accordance with the bitmap and based at least in part on the information identifying the one or more control channel monitoring span capabilities, a span pattern indicating one or more locations of one or more spans in a slot.

In some aspects, an apparatus for wireless communication may include means for transmitting, to a base station, information identifying one or more control channel monitoring span capabilities; means for receiving, from the base station, information identifying a plurality of control channel monitoring occasions; means for generating a bitmap based at least in part on the plurality of control channel monitoring occasions; and means for determining, in accordance with the bitmap and based at least in part on the information identifying the one or more control channel monitoring span capabilities, a span pattern indicating one or more locations of one or more spans in a slot.

Aspects generally include a method, apparatus, system, computer program product, non-transitory computer-readable medium, user equipment, base station, wireless communication device, and processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
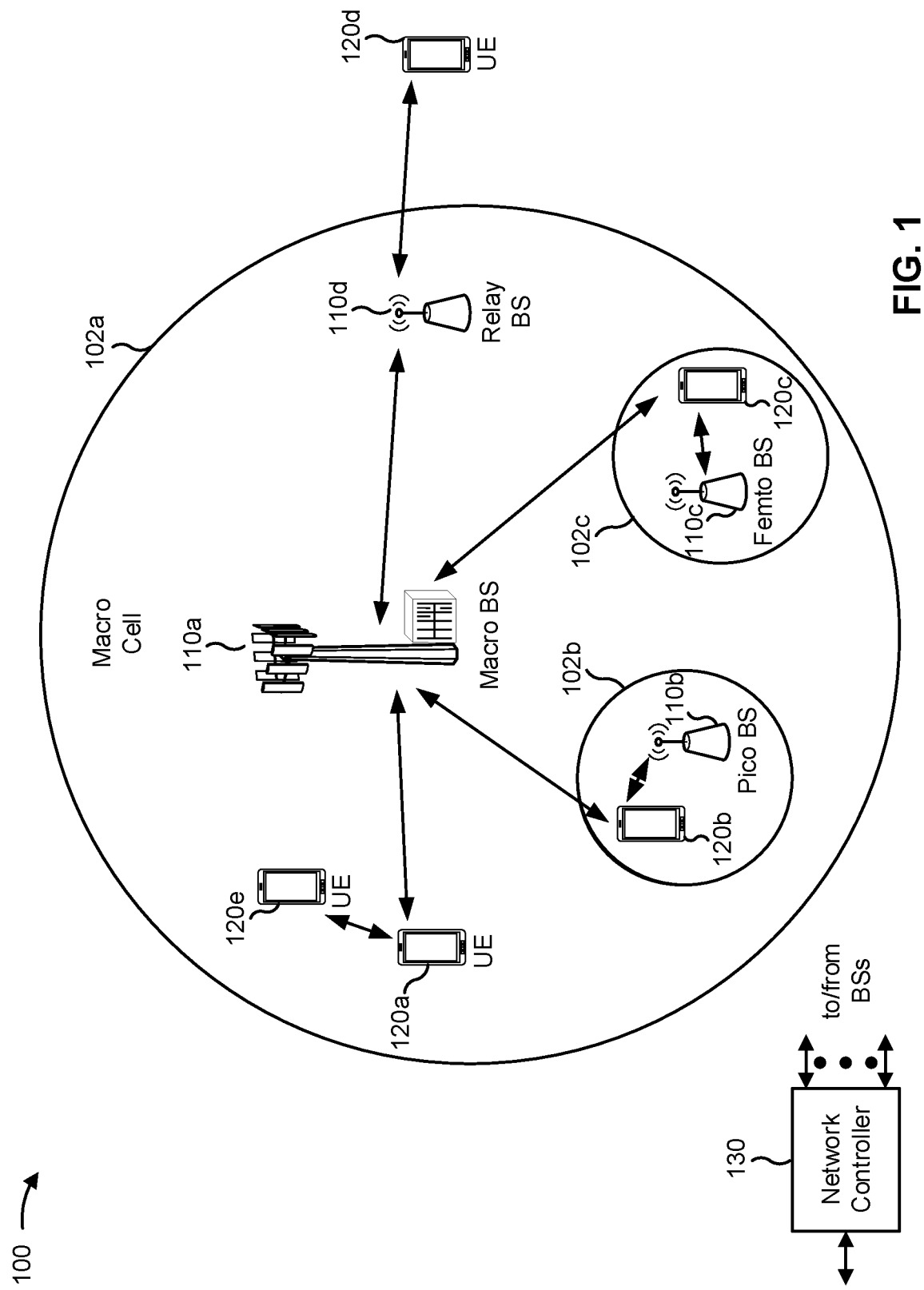
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
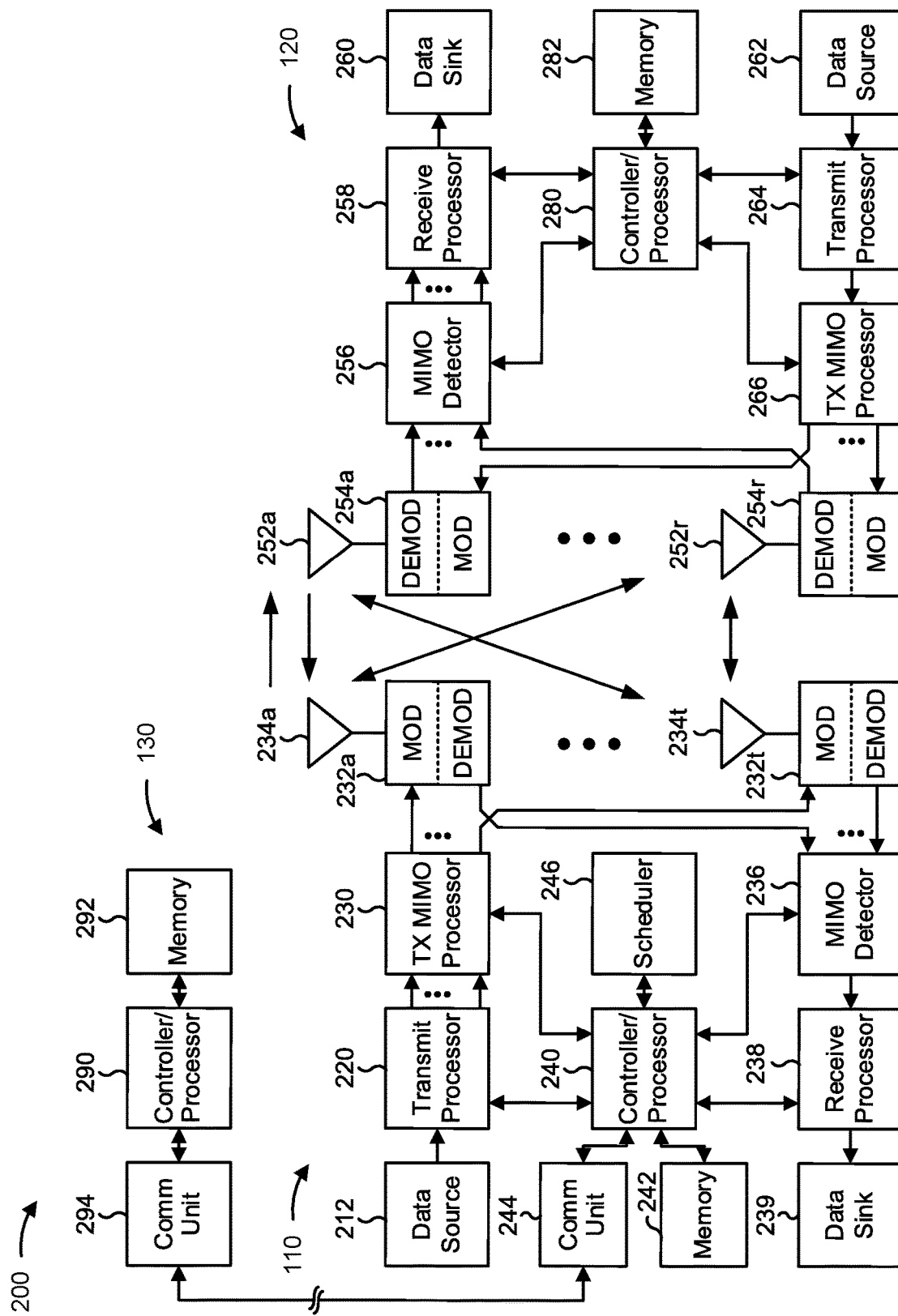
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with PDCCH control channel monitoring span determination, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for transmitting, to a base station, information identifying one or more control channel monitoring span capabilities; means for receiving, from the base station, information identifying a plurality of control channel monitoring occasions; means for generating a bitmap based at least in part on the plurality of control channel monitoring occasions; means for determining, in accordance with the bitmap and based at least in part on the information identifying the one or more control channel monitoring span capabilities, a span pattern indicating one or more locations of one or more spans in a slot; means for generating a bitmap, wherein an lth bit of the bitmap indicates whether an lth symbol of any slot is part of any control channel monitoring occasion of the plurality of control channel monitoring occasions; means for mapping a first span, of the one or more spans, to an earliest bit of the bitmap for which a corresponding symbol of any slot is part of any control channel monitoring occasion of the plurality of control channel monitoring occasions; means for mapping a second span, of the one or more spans, to a next bit of the bitmap that is not included in the first span and for which a corresponding symbol of any slot is part of any control channel monitoring occasion of the plurality of control channel monitoring occasions, wherein a span length of the one or more spans is equal to a maximum between a maximum value of all control resource set durations of the plurality of control channel monitoring occasions and a minimum value of maximum span lengths identified by the information identifying the one or more control channel monitoring span capabilities; and/or the like. In some aspects, such means may include one or more components of UE 120 described in connection with FIG. 2.

As indicated above, FIG. 2 is provided as an example. Other examples may differ from what is described with regard to FIG. 2.

5G/NR provides flexible monitoring occasions for the physical downlink control channel (PDCCH) via the search space and control resource set (CORESET) definition. In principle, a UE could monitor PDCCH candidates in any symbol in a slot, as long as the configuration of the PDCCH monitoring occasions satisfies certain rules, which may be determined based at least in part on a UE capability. The UE may determine whether a configuration of a set of PDCCH monitoring occasions is in accordance with the UE's capability by determining whether the set of PDCCH monitoring occasions conform to one or more control channel monitoring spans of the UE. A "control channel monitoring span" may be referred to herein as a span.

The span may be based at least in part on a minimum permissible spacing of first symbols of two or more spans (referred to herein as X) and a maximum permissible length of a span (referred to herein as Y). When no span arrangement can be mapped with spans that, collectively, fully include all PDCCH monitoring occasions of a slot, the UE may determine an error based at least in part on the PDCCH monitoring occasion configuration being non-conformant with the UE's capabilities. The UE may indicate the capabilities X and Y to a scheduling entity, such as a BS. In some cases, the UE may indicate multiple sets of capabilities. These capabilities may be referred to herein as control channel monitoring span capabilities. The definition of a control channel monitoring span may provide various constraints for span determination, as described in more detail elsewhere herein.

In some cases, the span locations in a slot may not be deterministic. This may provide improved flexibility on the network side. However, non-deterministic span locations may significantly increase UE complexity, and may create a misalignment between the network and the UE regarding the actual span locations.

Some techniques and apparatuses described herein provide determination of locations of a set of spans based at least in part on PDCCH locations in one or more slots. For example, the UE (or the BS) may determine a span pattern based at least in part on control channel monitoring span capabilities of the UE and/or starting symbols of the PDCCH monitoring occasion locations. In this way, the BS and the UE may determine span patterns (e.g., based at least in part on a deterministic or specified approach), thereby providing improved certainty regarding conformance with UE configuration and reducing UE complexity.

In some aspects, a slot can include one or more spans. In some aspects, each span is contained in one slot. In some aspects, spans do not overlap. In some aspects, every monitoring occasion is fully contained in one span. In some aspects, a span may or may not contain monitoring occasions in a slot. In some aspects, the same span arrangement repeats in every slot. In some aspects, the minimum distance between the start of any two spans is X, the maximum length on any span is Y, where the pair [X, Y] is one of the UE reported values. In some aspects, a particular PDCCH monitoring configuration meets the UE capability limitation if there is at least one span arrangement, which, when the same span arrangement is applied to all slots, satisfies the above for at least one of the UE reported values in every slot.

Figure 3A:
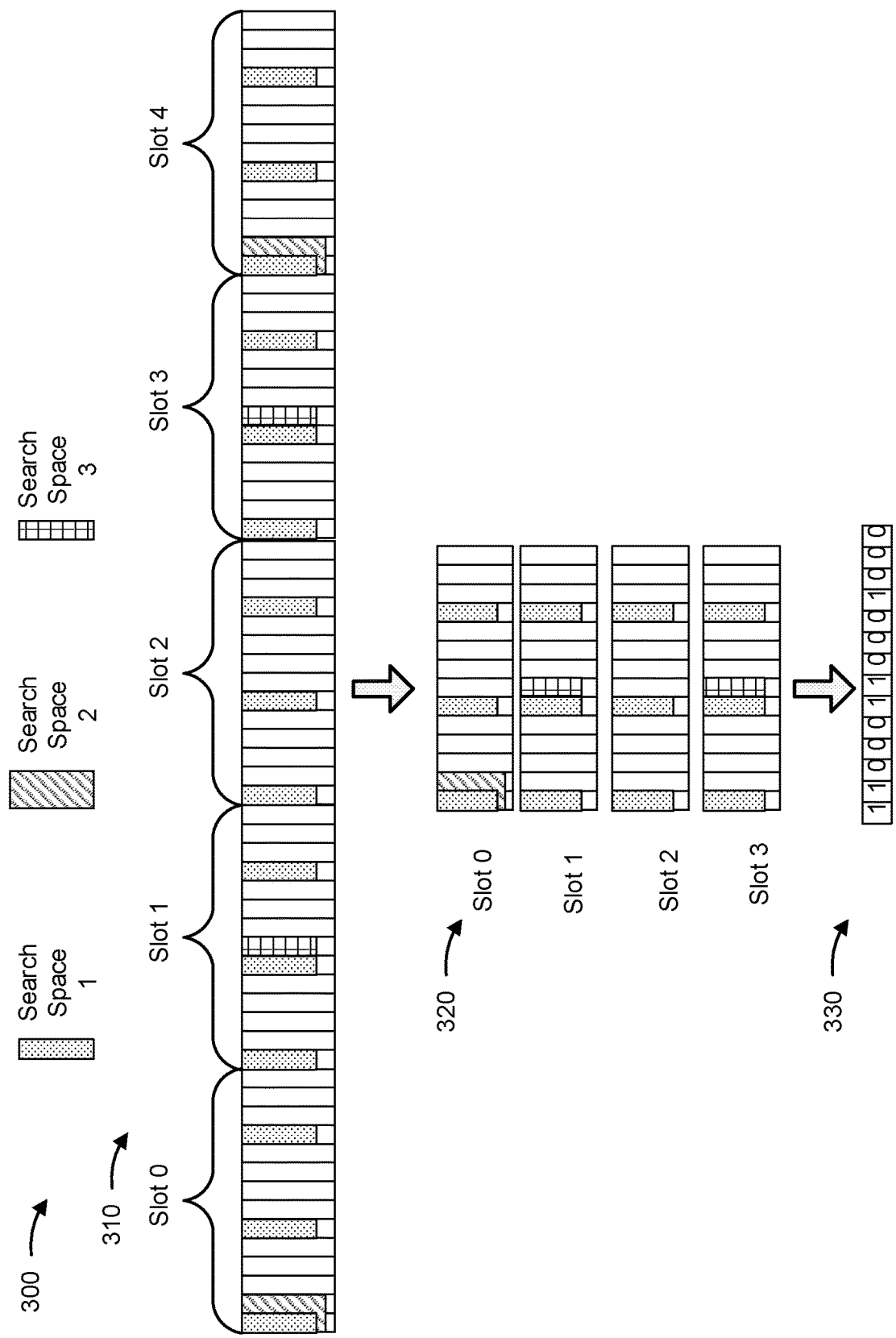
FIGS. 3A and 3B are diagrams illustrating examples of PDCCH control channel monitoring span determination, in accordance with various aspects of the present disclosure.
Figure 3B:
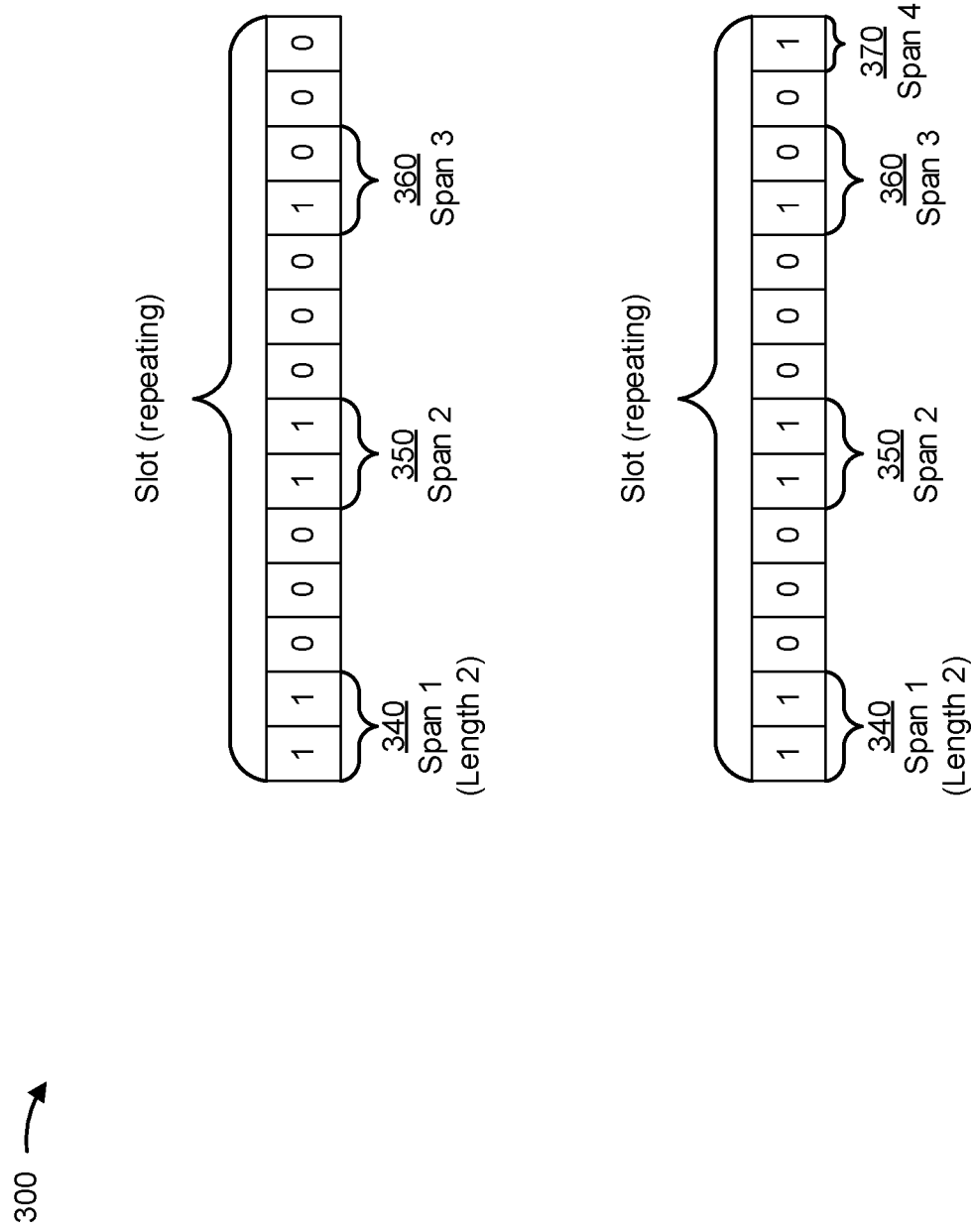

FIGS. 3A and 3B are diagrams illustrating examples 300 of PDCCH control channel monitoring span determination, in accordance with various aspects of the present disclosure. As shown by reference number 310, example 300 concerns a set of slots 1 through 5. Search spaces 1, 2, and 3 are mapped on slots 1 through 5 with various periodicities. It can be seen that search space 1 repeats every slot and occurs on symbols 0, 5, and 10 of a slot; search space 2 repeats every fourth slot (i.e., slot 0, slot 4, and so on) and occurs on symbols 0 and 1 of a slot; and search space 3 repeats every other slot (i.e., slot 1, slot 3, and so on) and occurs on symbol 6 of a slot. A UE 120 that receives information identifying the PDCCH monitoring occasions associated with search spaces 1, 2, and 3 may determine whether these PDCCH monitoring occasions are conformant with UE 120's capabilities by mapping spans to the PDCCH monitoring occasions. This process is described in more detail below.

In some aspects, UE 120 may determine a span length (not shown). For example, UE 120 may determine the span length based at least in part on a CORESET length and a value of Y reported by the UE. More particularly, the UE 120 may determine the span length as L, where L=max(max(CORESET lengths), min(Y)). As other examples, L=max(CORESET)) or L=min(Y).

As shown by reference number 310, the UE 120 may generate a multi-slot map of PDCCH monitoring occasions based at least in part on search space configurations. This multi-slot map may be periodic in accordance with the longest search space periodicity (e.g., that of search space 2). In some aspects, the multi-slot map may be based at least in part on UE-specific search spaces. In some aspects, the multi-slot map may be based at least in part on UE-specific search spaces and common search spaces.

As shown by reference number 320, the UE 120 may overlay each slot within the longest search space periodicity (here, slots 0 through 3 since slot 4 is in a next search space periodicity). As shown by reference number 330, the UE 120 may perform an OR operation to generate a bitmap of length 14 (since there are 14 OFDM symbols in a slot). As shown, the bitmap includes "1" values in symbols (denoted by the lowercase 1 herein) wherein any slot (of slots 0 through 3) has a PDCCH monitoring occasion. Thus, the bitmap is 11000110001000. As used herein, "bitmap" refers to information indicating symbols that are associated with a PDCCH monitoring occasion in any slot of slots 0 through 3. In some aspects, such a bitmap may include information other than a series of bits.

As shown in FIG. 3B, and by reference numbers 340, 350, and 360, the UE 120 may allocate a span pattern within a single slot. For example, the UE 120 may allocate the span pattern using a loop. A first span may start at a first 1-value bit in the bitmap and may have a length of 2 (or whatever span length is determined as described above). A next span may start at a next 1-value bit in the bitmap that is not already covered by the first span or any other allocated span. If a last span would overlap into a next slot (which is not permitted), then the last span may be shortened to fit within the single slot, as shown by reference number 370 in FIG. 3B. The span pattern shown in FIG. 3B may repeat in every slot (e.g., multiple slots, each slot of a connection between the UE 120 and the BS 110, and/or the like).

In some aspects, spans do not overlap. In some aspects, every span is contained in a single slot. In some aspects, the same span pattern repeats in every slot. In some aspects, the separation between consecutive spans within and across slots may be unequal, but the same [X, Y] limit may be satisfied by all spans. In some aspects, every monitoring occasion is fully contained in one span. In some aspects, in order to determine a suitable span pattern, first a bitmap b(l), 0≤l≤13 is generated, where b(l)=1 if symbol l of any slot is part of a monitoring occasion, and b(l)=0 otherwise. In some aspects, the first span in the span pattern begins at the smallest l for which b(l)=1. In some aspects, the next span in the span pattern begins at the smallest l not included in the previous span(s) for which b(l)=1. In some aspects, the span duration (e.g., span length) is max{maximum value of all CORESET durations, minimum value of Y in the UE reported candidate value} except possibly the last span in a slot, which can be of shorter duration. In some aspects, a particular PDCCH monitoring configuration meets the UE capability limitation if the span arrangement satisfies the gap separation for at least one [X, Y] in the UE reported candidate value set in every slot, including cross slot boundary.

In some aspects, spans do not overlap. In some aspects, every span is contained in a single slot. In some aspects, the same span arrangement repeats in every slot. In some aspects, the separation between consecutive spans within and across slots may be unequal, and the same [X, Y] limit may be satisfied by all spans. In some aspects, every monitoring occasion is fully contained in one span. In some aspects, the first span in the span arrangement begins at the smallest start symbol index among all monitoring occasions and among all slots. In some aspects, the next span in the span arrangement begins at the smallest start symbol index among all monitoring occasions and among all slots not included in the previous span(s). In some aspects, the span duration (e.g., span length) is max{maximum value of all CORESET durations, minimum value of Y in the UE reported candidate value}, except possibly the last span in a slot, which can be of shorter duration. In some aspects, a particular PDCCH monitoring configuration meets the UE capability limitation if the span arrangement satisfies the gap separation for at least one ([X, Y]) in the UE reported candidate value set in every slot, including cross slot boundary.

In some aspects, a specified slot-periodic span arrangement may be required to satisfy the following criteria: a slot can include one or more spans. Each span is contained in one slot. Spans do not overlap. Every monitoring occasion is fully contained in one span. A span may or may not contain monitoring occasions in a slot. The same span arrangement repeats in every slot. The minimum distance between the start of any two spans is X, the maximum length on any span is Y, where the pair [X, Y] is one of the UE reported values. The first symbol of every span must have a monitoring occasion at least in one of the slots. A particular PDCCH monitoring configuration meets the UE capability limitation if there is at least one span arrangement, which, when the same span arrangement is applied to all slots, satisfies the above for at least one of the UE reported values in every slot.

In some aspects, the UE 120 (or the BS 110) may first pick the first pair of X and Y, perform one or more of the above-described operations with L=Y, and may determine if a valid span can be generated. If a valid span can be generated, then the UE 120 may accept the determined control channel monitoring span. If a valid span cannot be generated, then the UE 120 may move to the next pair of reported (X,Y) capability, and may perform the same algorithm with L as the updated value of Y. The UE 120 may stop this process if the UE 120 is able to find one valid control channel monitoring span that agrees with the (X,Y) capability, or if the UE 120 has checked over all reported capabilities.

The above operations to determine the span arrangement may be performed by the UE 120 or the BS 110.

As indicated above, FIGS. 3A and 3B are provided as one or more examples. Other examples may differ from what is described with respect to FIGS. 3A and 3B.

Figure 4:
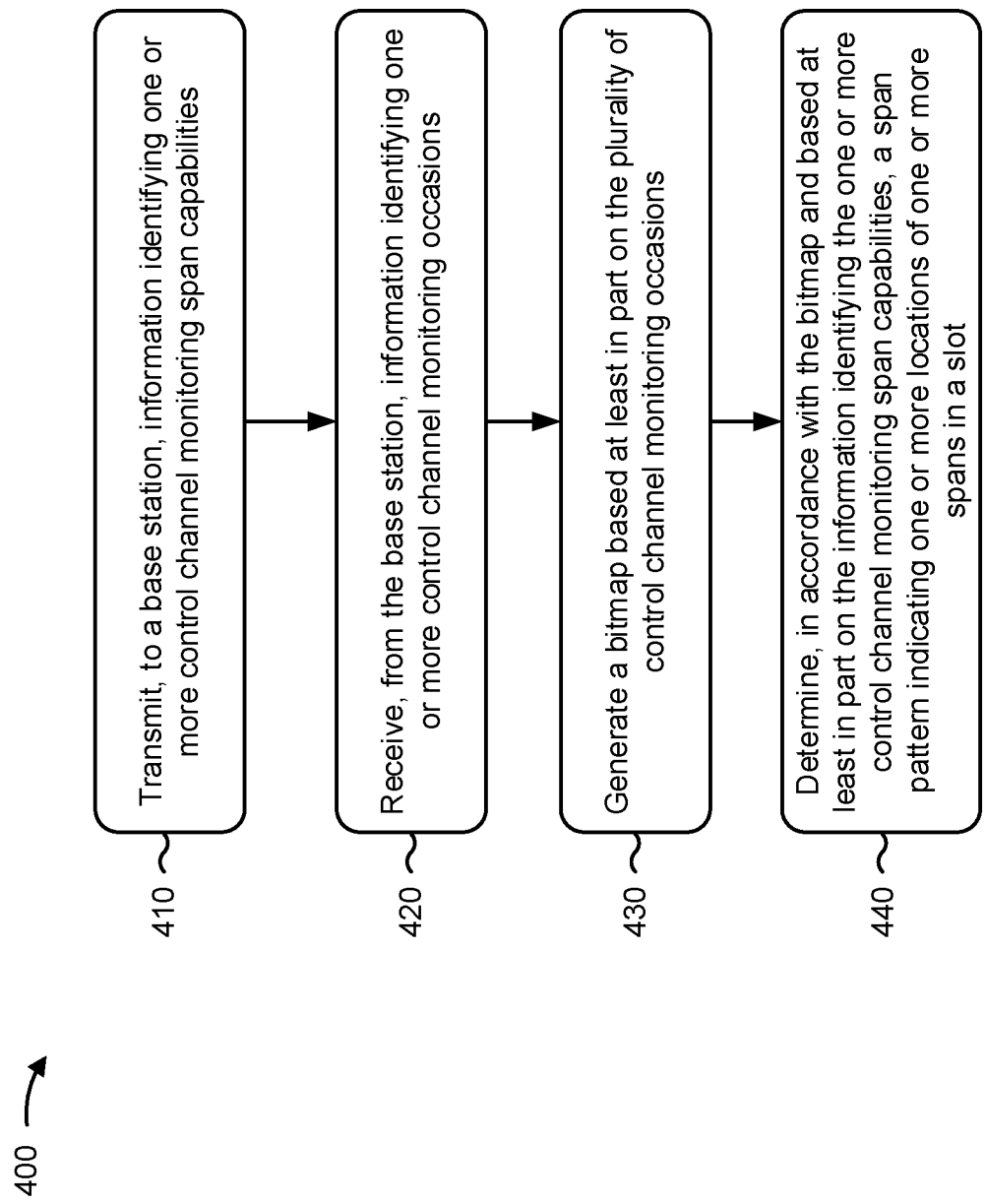
FIG. 4 is a diagram illustrating an example process performed, for example, by a user equipment, in accordance with various aspects of the present disclosure.

FIG. 4 is a diagram illustrating an example process 400 performed, for example, by a user equipment, in accordance with various aspects of the present disclosure. Example process 400 is an example where a user equipment (e.g., user equipment 120 and/or the like) performs operations associated with PDCCH control channel monitoring span determination.

As shown in FIG. 4, in some aspects, process 400 may include transmitting, to a base station, information identifying one or more control channel monitoring span capabilities (block 410). For example, the user equipment (e.g., using controller/processor 280, transmit processor 264, TX MIMO processor 266, MOD 254, antenna 252, and/or the like) may transmit, to a base station, information identifying one or more control channel monitoring span capabilities, as described above.

As further shown in FIG. 4, in some aspects, process 400 may include receiving, from the base station, information identifying a plurality of control channel monitoring occasions (block 420). For example, the user equipment (e.g., using antenna 252, DEMOD 254, MIMO detector 256, receive processor 258, controller/processor 280, and/or the like) may receive, from the base station, information identifying a plurality of control channel monitoring occasions, as described above.

As further shown in FIG. 4, in some aspects, process 400 may include generating a bitmap based at least in part on the plurality of control channel monitoring occasions (block 430). For example, the user equipment (e.g., using controller/processor 280 and/or the like) may generate a bitmap based at least in part on the plurality of control channel monitoring occasions.

As further shown in FIG. 4, in some aspects, process 400 may include determining, in accordance with the bitmap and based at least in part on the information identifying the one or more control channel monitoring span capabilities, a span pattern indicating one or more locations of one or more spans in a slot (block 440). For example, the user equipment (e.g., using controller/processor 280 and/or the like) may determine, in accordance with the bitmap and based at least in part on the information identifying the one or more control channel monitoring span capabilities, a span pattern indicating one or more locations of one or more spans in a slot, as described above.

Process 400 may include additional aspects, such as any single aspect or any combination of aspects described below and/or in connection with one or more other processes described elsewhere herein.

In a first aspect, a control channel monitoring span capability, of the one or more control channel monitoring span capabilities, identifies a minimum distance between a start of two spans and a maximum length of a span of the one or more spans.

In a second aspect, alone or in combination with the first aspect, determining the span pattern indicating the one or more locations of the one or more spans in the slot is based at least in part on a span length. In some aspects, the span length is based at least in part on the one or more control channel monitoring span capabilities and a maximum length of respective control resource sets of the plurality of control channel monitoring occasions.

In a third aspect, alone or in combination with one or more of the first and second aspects, a control channel monitoring occasion, of the plurality of control channel monitoring occasions, is associated with a search space periodicity longer than the slot. In some aspects, the one or more locations of the one or more spans in the slot are based at least in part on the search space periodicity.

In a fourth aspect, alone or in combination with one or more of the first through third aspects, determining the span pattern indicating the one or more locations is based at least in part on locations of UE-specific search spaces identified by the plurality of control channel monitoring occasions.

In a fifth aspect, alone or in combination with one or more of the first through fourth aspects, determining the span pattern indicating the one or more locations is based at least in part on locations of UE-specific search spaces and common search spaces identified by the plurality of control channel monitoring occasions.

In a sixth aspect, alone or in combination with one or more of the first through fifth aspects, the one or more locations are determined based at least in part on combining information indicating locations of the plurality of control channel monitoring occasions across multiple different slots. For example, the combining may comprise a union operation, an OR operation, or the like.

In a seventh aspect, alone or in combination with one or more of the first through sixth aspects, a location, of the one or more locations, starts at a first symbol of a first control channel monitoring occasion, of the plurality of control channel monitoring occasions, across all slots that include the plurality of control channel monitoring occasions.

In an eighth aspect, alone or in combination with one or more of the first through seventh aspects, a last span, of the one or more spans, is shortened when the last span is associated with a span length that would exceed an end of the slot.

In a ninth aspect, alone or in combination with one or more of the first through eighth aspects, a last symbol of the last span is determined as a last symbol of the slot.

In a tenth aspect, alone or in combination with one or more of the first through ninth aspects, an lth bit of the bitmap indicates whether an lth symbol of any slot is part of any control channel monitoring occasion of the plurality of control channel monitoring occasions, and wherein determining the span pattern indicating one or more locations of one or more spans in a slot further comprises: mapping a first span, of the one or more spans, to an earliest bit of the bitmap for which a corresponding symbol of any slot is part of any control channel monitoring occasion of the plurality of control channel monitoring occasions; and mapping a second span, of the one or more spans, to a next bit of the bitmap that is not included in the first span and for which a corresponding symbol of any slot is part of any control channel monitoring occasion of the plurality of control channel monitoring occasions.

In an eleventh aspect, alone or in combination with one or more of the first through tenth aspects, the span pattern repeats across multiple slots.

In a twelfth aspect, alone or in combination with one or more of the first through eleventh aspects, the one or more locations of the one or more spans are determined for multiple slots, wherein a first symbol of every span, of the one or more spans, has a monitoring occasion in at least one slot of the multiple slots.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software codeit being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   transmitting, to a base station, information identifying one or more control channel monitoring span capabilities;
   receiving, from the base station, information identifying a plurality of control channel monitoring occasions;
   generating a bitmap based at least in part on the plurality of control channel monitoring occasions, wherein the bitmap corresponds to a plurality of slots, and wherein an lth bit of the bitmap is equal to 1 when an lth symbol of any slot is part of any control channel monitoring occasion of the plurality of control channel monitoring occasions; and
   determining, in accordance with the bitmap and based at least in part on the information identifying the one or more control channel monitoring span capabilities, a span pattern indicating one or more locations of one or more spans in a slot of the plurality of slots.

2. The method of claim 1, wherein a control channel monitoring span capability, of the one or more control channel monitoring span capabilities, identifies a minimum distance between a start of two spans and a maximum length of a span of the one or more spans.

3. The method of claim 1, wherein determining the span pattern indicating the one or more locations of the one or more spans in the slot is based at least in part on determining a span length, wherein the span length is based at least in part on the one or more control channel monitoring span capabilities and a maximum length of respective control resource sets of the plurality of control channel monitoring occasions.

4. The method of claim 3, wherein determining the span pattern indicating the one or more locations is based at least in part on locations of UE-specific search spaces identified by the plurality of control channel monitoring occasions.

5. The method of claim 3, wherein determining the span pattern indicating the one or more locations is based at least in part on locations of UE-specific search spaces and common search spaces identified by the plurality of control channel monitoring occasions.

6. The method of claim 1, wherein the one or more locations are determined based at least in part on combining information indicating locations of the plurality of control channel monitoring occasions across multiple different slots of the plurality of slots.

7. The method of claim 1, wherein a location, of the one or more locations, starts at a first symbol of a first control channel monitoring occasion, of the plurality of control channel monitoring occasions, across all slots that include the plurality of control channel monitoring occasions.

8. The method of claim 7, wherein a last span, of the one or more spans, is shortened when the last span is associated with a span length that would exceed an end of the slot.

9. The method of claim 8, wherein a last symbol of the last span is determined as a last symbol of the slot.

10. The method of claim 1, wherein determining the span pattern indicating the one or more locations of the one or more spans in the slot comprises:
    mapping a first span, of the one or more spans, to begin at a smallest lth bit of the bitmap which is equal to 1, wherein a span length of the one or more spans is equal to a maximum between a maximum value of all control resource set durations of the plurality of control channel monitoring occasions and a minimum value of maximum span lengths identified by the information identifying the one or more control channel monitoring span capabilities.

11. The method of claim 1, wherein the span pattern repeats across multiple slots of the plurality of slots.

12. The method of claim 1, wherein the one or more locations of the one or more spans are determined for multiple slots of the plurality of slots, and wherein a first symbol of every span, of the one or more spans, has a monitoring occasion in at least one slot of the multiple slots.

13. A user equipment for wireless communication, comprising:
a memory; and
one or more processors operatively coupled to the memory, the memory and the one or more processors configured to:
transmit, to a base station, information identifying one or more control channel monitoring span capabilities;
receive, from the base station, information identifying a plurality of control channel monitoring occasions;
generate a bitmap based at least in part on the plurality of control channel monitoring occasions, wherein the bitmap corresponds to a plurality of slots, and wherein an lth bit of the bitmap is equal to 1 when an lth symbol of any slot is part of any control channel monitoring occasion of the plurality of control channel monitoring occasions; and
determine, in accordance with the bitmap and based at least in part on the information identifying the one or more control channel monitoring span capabilities, a span pattern indicating one or more locations of one or more spans in a slot of the plurality of slots.

14. The UE of claim 13, wherein a control channel monitoring span capability, of the one or more control channel monitoring span capabilities, identifies a minimum distance between a start of two spans and a maximum length of a span of the one or more spans.

15. The UE of claim 13, wherein determining the span pattern indicating the one or more locations of the one or more spans in the slot is based at least in part on determining a span length, wherein the span length is based at least in part on the one or more control channel monitoring span capabilities and a maximum length of respective control resource sets of the plurality of control channel monitoring occasions.

16. The UE of claim 13, wherein a control channel monitoring occasion, of the plurality of control channel monitoring occasions, is associated with a search space periodicity longer than the slot, and
wherein the one or more locations of the one or more spans in the slot are based at least in part on the search space periodicity.

17. The UE of claim 16, wherein determining the span pattern indicating the one or more locations is based at least in part on locations of UE-specific search spaces identified by the plurality of control channel monitoring occasions.

18. The UE of claim 16, wherein determining the span pattern indicating the one or more locations is based at least in part on locations of UE-specific search spaces and common search spaces identified by the plurality of control channel monitoring occasions.

19. The UE of claim 16, wherein the one or more locations are determined based at least in part on combining information indicating locations of the plurality of control channel monitoring occasions across multiple different slots of the plurality of slots.

20. The UE of claim 16, wherein a location, of the one or more locations, starts at a first symbol of a first control channel monitoring occasion, of the plurality of control channel monitoring occasions, across all slots that include the plurality of control channel monitoring occasions.

21. The UE of claim 20, wherein a last span, of the one or more spans, is shortened when the last span is associated with a span length that would exceed an end of the slot.

22. The UE of claim 21, wherein a last symbol of the last span is determined as a last symbol of the slot.

23. The UE of claim 13, wherein the one or more processors, when determining the span pattern indicating the one or more locations of the one or more spans in the slot, are configured to:
map a first span, of the one or more spans, to begin at a smallest lth bit of the bitmap which is equal to 1,
wherein a span length of the one or more spans is equal to a maximum between a maximum value of all control resource set durations of the plurality of control channel monitoring occasions and a minimum value of maximum span lengths identified by the information identifying the one or more control channel monitoring span capabilities.

24. The UE of claim 13, wherein the span pattern repeats across multiple slots of the plurality of slots.

25. A non-transitory computer-readable medium storing one or more instructions for wireless communication, the one or more instructions comprising:
one or more instructions that, when executed by one or more processors of a user equipment, cause the one or more processors to:
transmit, to a base station, information identifying one or more control channel monitoring span capabilities;
receive, from the base station, information identifying a plurality of control channel monitoring occasions;
generate a bitmap based at least in part on the plurality of control channel monitoring occasions, wherein the bitmap corresponds to a plurality of slots, and wherein an lth bit of the bitmap is equal to 1 when an lth symbol of any slot is part of any control channel monitoring occasion of the plurality of control channel monitoring occasions; and
determine, in accordance with the bitmap and based at least in part on the information identifying the one or more control channel monitoring span capabilities, a span pattern indicating one or more locations of one or more spans in a slot of the plurality of slots.

26. The non-transitory computer-readable medium of claim 25, wherein the one or more locations are determined based at least in part on combining information indicating locations of the plurality of control channel monitoring occasions across multiple different slots of the plurality of slots.

27. An apparatus for wireless communication, comprising:
means for transmitting, to a base station, information identifying one or more control channel monitoring span capabilities;
means for receiving, from the base station, information identifying a plurality of control channel monitoring occasions;
means for generating a bitmap based at least in part on the plurality of control channel monitoring occasions, wherein the bitmap corresponds to a plurality of slots, and wherein an lth bit of the bitmap is equal to 1 when an lth symbol of any slot is part of any control channel monitoring occasion of the plurality of control channel monitoring occasions; and means for determining, in accordance with the bitmap and based at least in part on the information identifying the one or more control channel monitoring span capabilities, a span pattern indicating one or more locations of one or more spans in a slot of the plurality of slots.

28. The apparatus of claim 27, wherein the means for determining the span pattern indicating the one or more locations of the one or more spans of the slot comprises:

means for mapping a first span, of the one or more spans, to begin at a smallest lth bit of the bitmap which is equal to, wherein a span length of the one or more spans is equal to a maximum between a maximum value of all control resource set durations of the plurality of control channel monitoring occasions and a minimum value of maximum span lengths identified by the information identifying the one or more control channel monitoring span capabilities.

29. The method of claim 1, wherein determining the span pattern indicating the one or more locations of the one or more spans in the slot comprises:

mapping a next span, of the one or more spans, to begin at a smallest lth bit of the bitmap which is equal to 1 and is not included in one or more previous spans of the one or more spans.

30. The UE of claim 13, wherein the one or more processors, when determining the span pattern indicating the one or more locations of the one or more spans in slot, are configured to:

map a next span, of the one or more spans, to begin at a smallest lth bit of the bitmap which is equal to 1 and is not included in one or more previous spans of the one or more spans.

* * * * *